(12) United States Patent
Fiedler

(10) Patent No.: US 10,578,241 B2
(45) Date of Patent: Mar. 3, 2020

(54) CLOSURE DEVICE FOR SECURING AN ELECTRONIC DEVICE ON A HOLDING DEVICE

(71) Applicant: Fidlock GmbH, Hannover (DE)

(72) Inventor: Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 169 days.

(21) Appl. No.: 15/528,561

(22) PCT Filed: Nov. 23, 2015

(86) PCT No.: PCT/EP2015/002344
§ 371 (c)(1),
(2) Date: May 22, 2017

(87) PCT Pub. No.: WO2016/078772
PCT Pub. Date: May 26, 2016

(65) Prior Publication Data
US 2017/0276290 A1 Sep. 28, 2017

(30) Foreign Application Priority Data
Nov. 21, 2014 (DE) .......................... 10 2014 223 844

(51) Int. Cl.
*F16M 11/04* (2006.01)
*F16M 11/08* (2006.01)
(Continued)

(52) U.S. Cl.
CPC ........... *F16M 11/041* (2013.01); *A45C 13/10* (2013.01); *F16M 11/08* (2013.01); *F16M 11/16* (2013.01);
(Continued)

(58) Field of Classification Search
CPC ...... F16M 11/041; F16M 11/16; F16M 11/08; A45C 13/10; A45F 2200/0516;
(Continued)

(56) References Cited

U.S. PATENT DOCUMENTS 4,982,581 A 1/1991 Furuyama
5,367,891 A * 11/1994 Furuyama ............ A44C 5/2057
63/900

(Continued)

FOREIGN PATENT DOCUMENTS

CN 202125493 U 1/2012
CN 203549211 U 4/2014
(Continued)

*Primary Examiner* — Greg Binda
(74) *Attorney, Agent, or Firm* — The Webb Law Firm

(57) ABSTRACT

A closure device for securing an electronic device on a holding device is provide. The closure device includes a first closure part having a first attaching part, a second closure part having a second attaching part and which can be attached to the first closure part in a closing direction, wherein at least one thread is arranged on one of the attaching parts and at least one engaging element is arranged on the other of the attaching parts for running onto the at least one thread when attaching the closure parts to one another, and a magnetic device that acts in a magnetically attracting manner between the first closure part and the second closure part during the attaching process.

15 Claims, 18 Drawing Sheets

(51) Int. Cl.
  *F16M 11/16*   (2006.01)
  *A45C 13/10*   (2006.01)
  *B60R 11/02*   (2006.01)
  *F16B 1/00*    (2006.01)

(52) U.S. Cl.
  CPC ....... *A45F 2200/0516* (2013.01); *B60R 11/02* (2013.01); *F16B 2001/0035* (2013.01); *Y10S 63/90* (2013.01); *Y10S 403/01* (2013.01); *Y10T 24/32* (2015.01)

(58) Field of Classification Search
  CPC .. F16B 2001/0035; B60R 11/02; Y10S 63/90; Y10S 403/01
  USPC ....................................... 174/562; 292/251.5
  See application file for complete search history.

(56) References Cited

U.S. PATENT DOCUMENTS

| | | |
|---|---|---|
| 8,516,665 B2 | 8/2013 | Clarke et al. |
| 2003/0103834 A1 | 6/2003 | Brancheriau |
| 2013/0161089 A1 | 6/2013 | Liu |

FOREIGN PATENT DOCUMENTS

| | | |
|---|---|---|
| DE | 19922618 A1 | 12/2000 |
| GB | 2449906 A | 12/2008 |
| JP | 6215609 U | 1/1987 |
| JP | 2002106530 A | 4/2002 |
| JP | 2003202009 A | 7/2003 |
| JP | 200444619 A | 2/2004 |
| WO | 3218028 A1 | 10/1992 |

\* cited by examiner

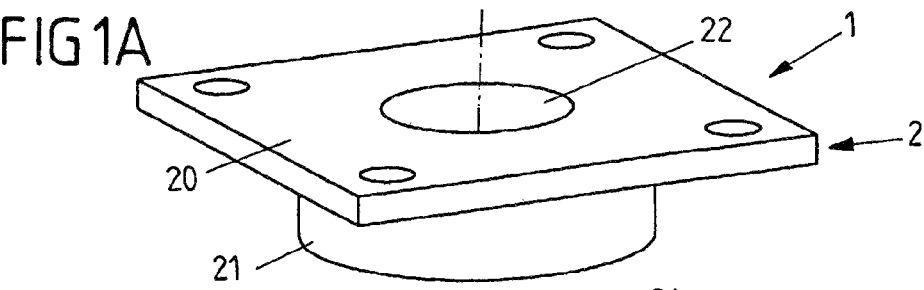
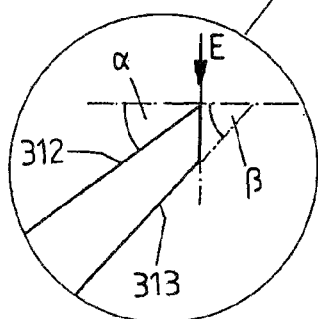
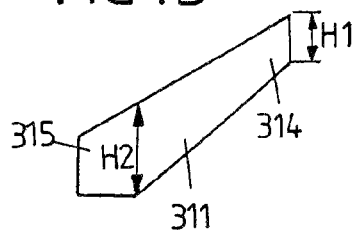
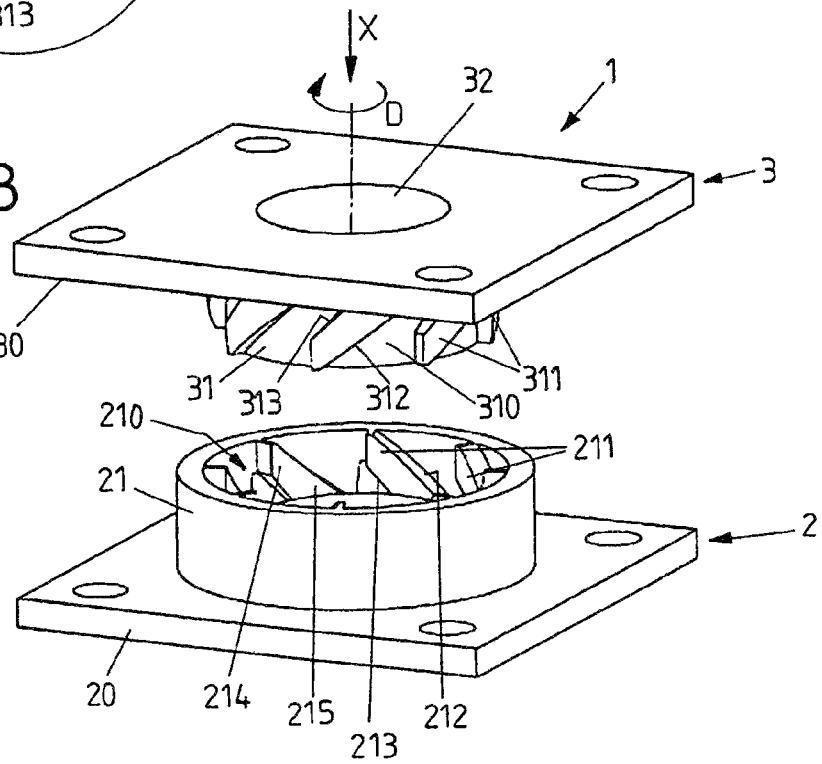

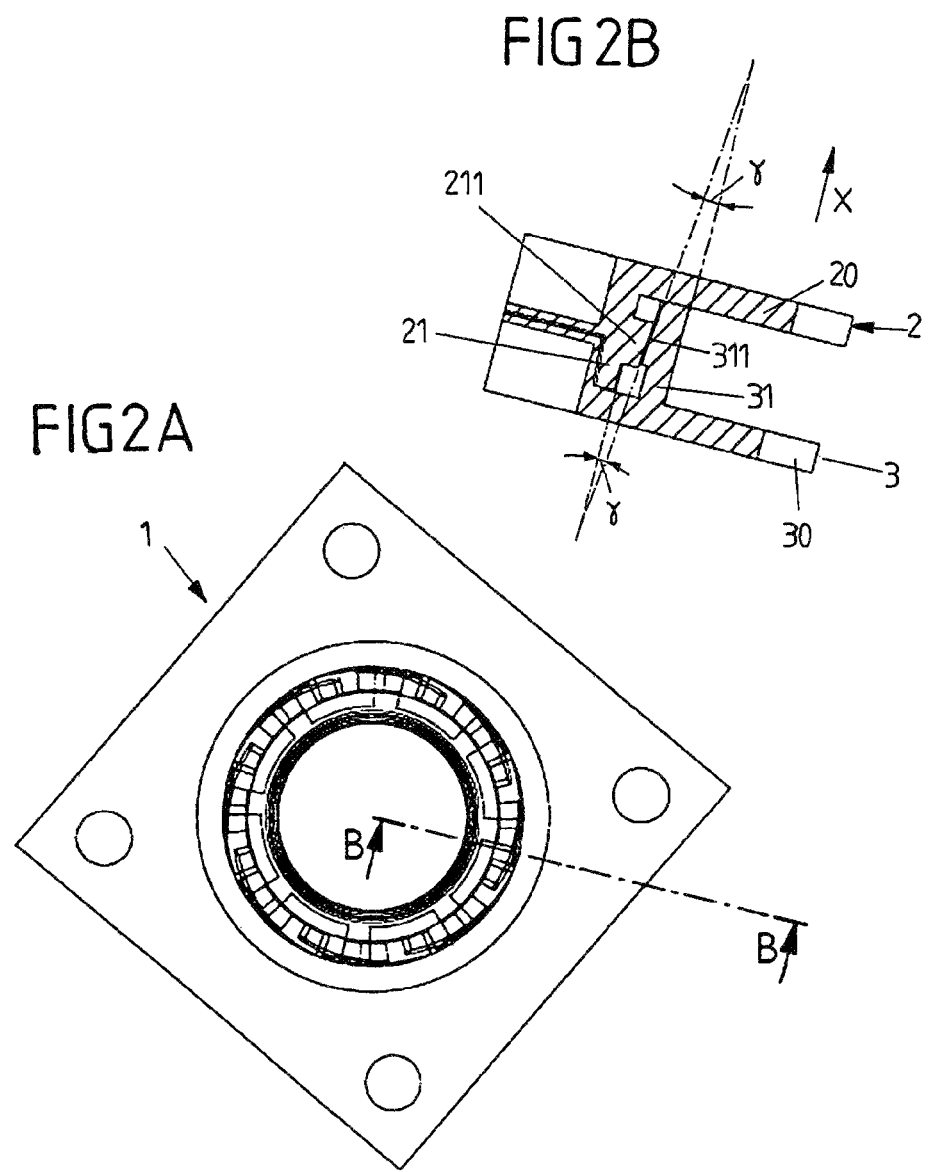

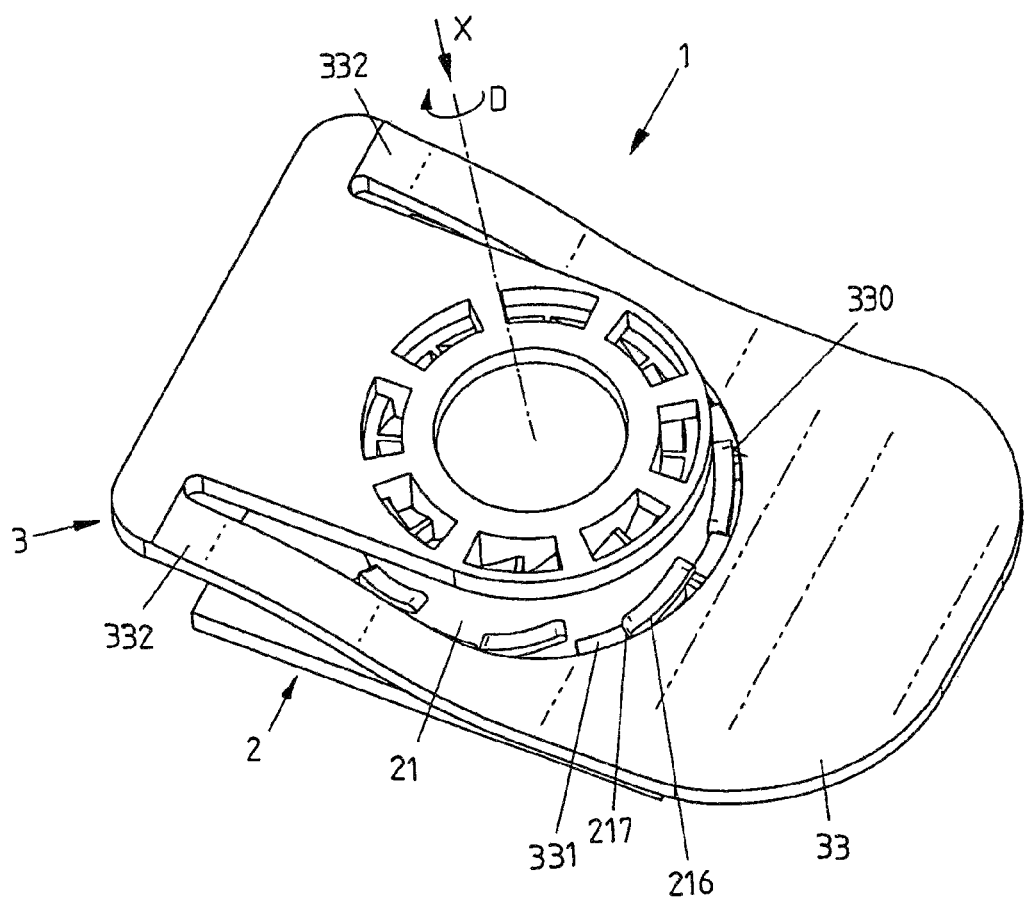

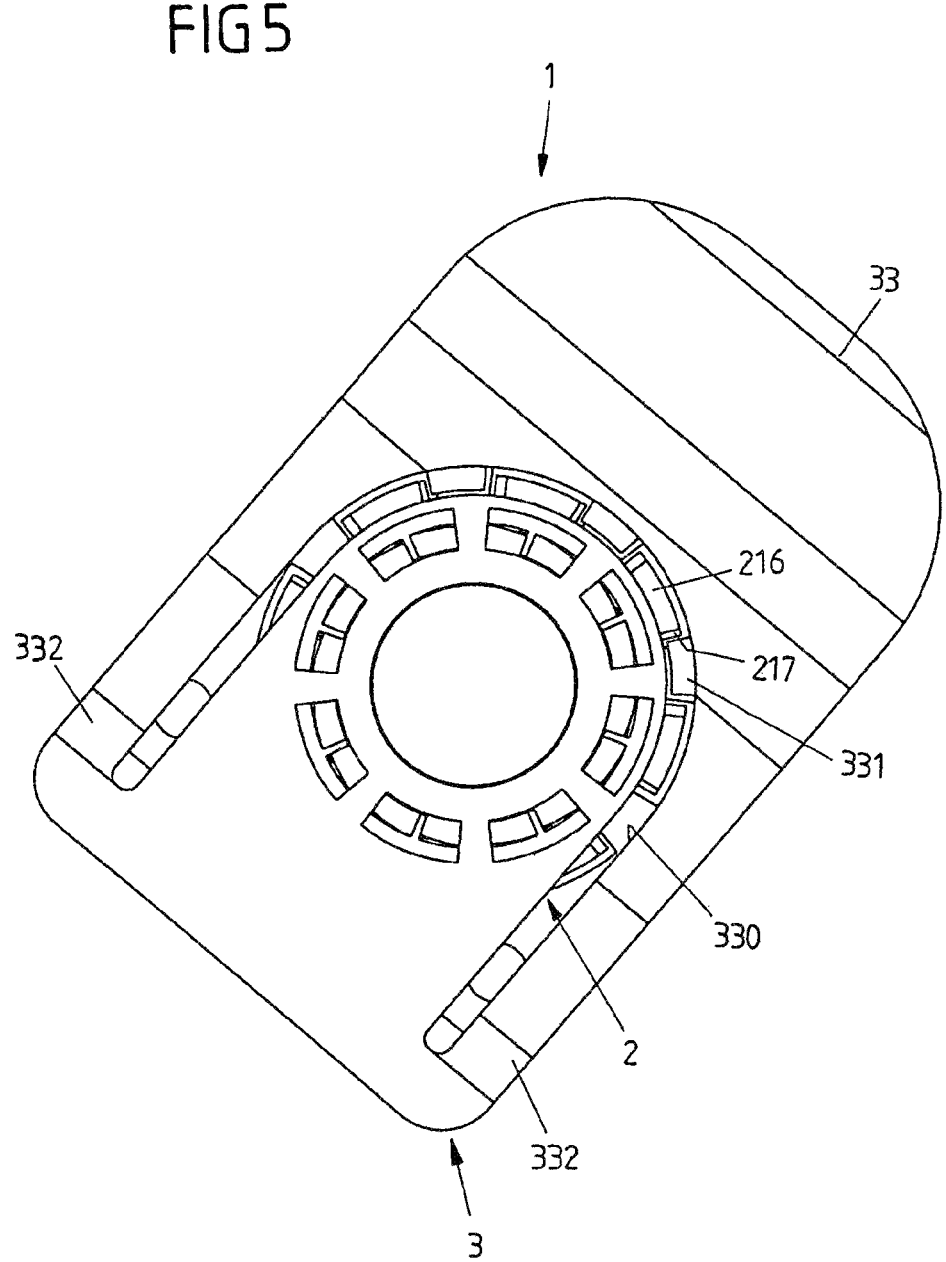

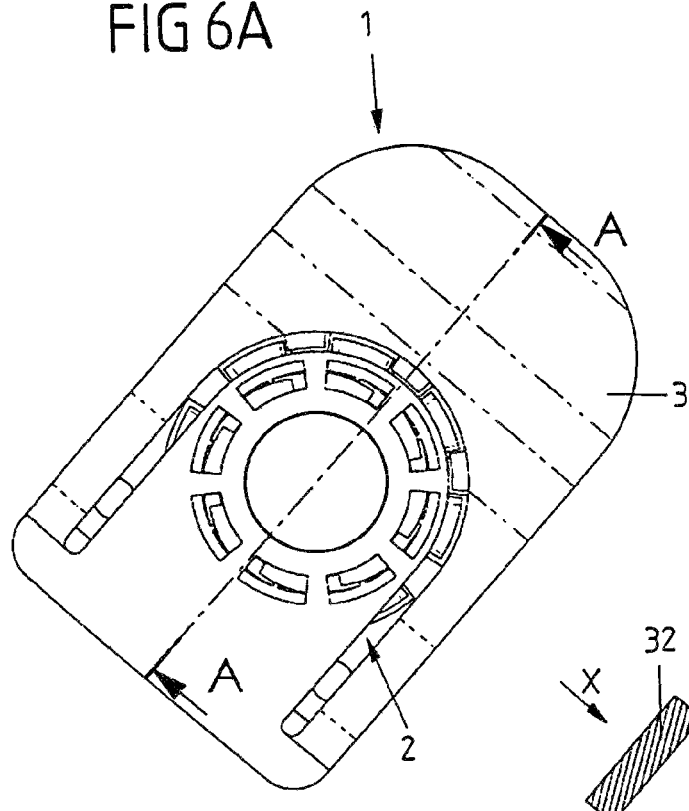
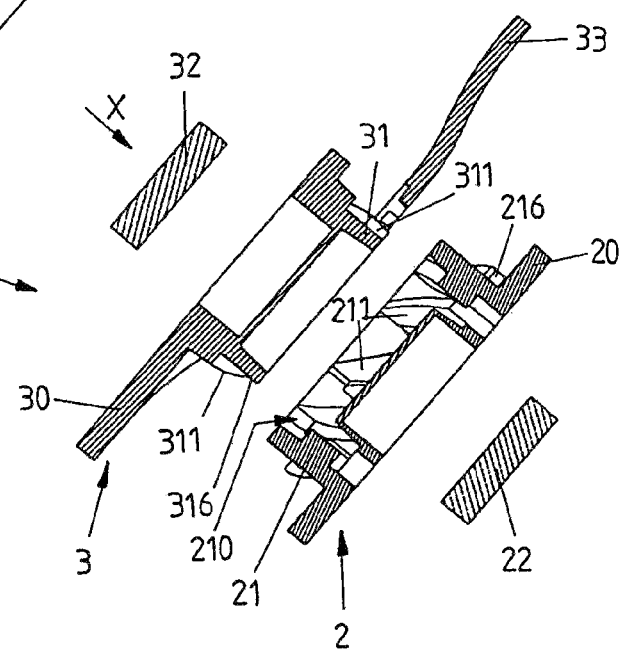

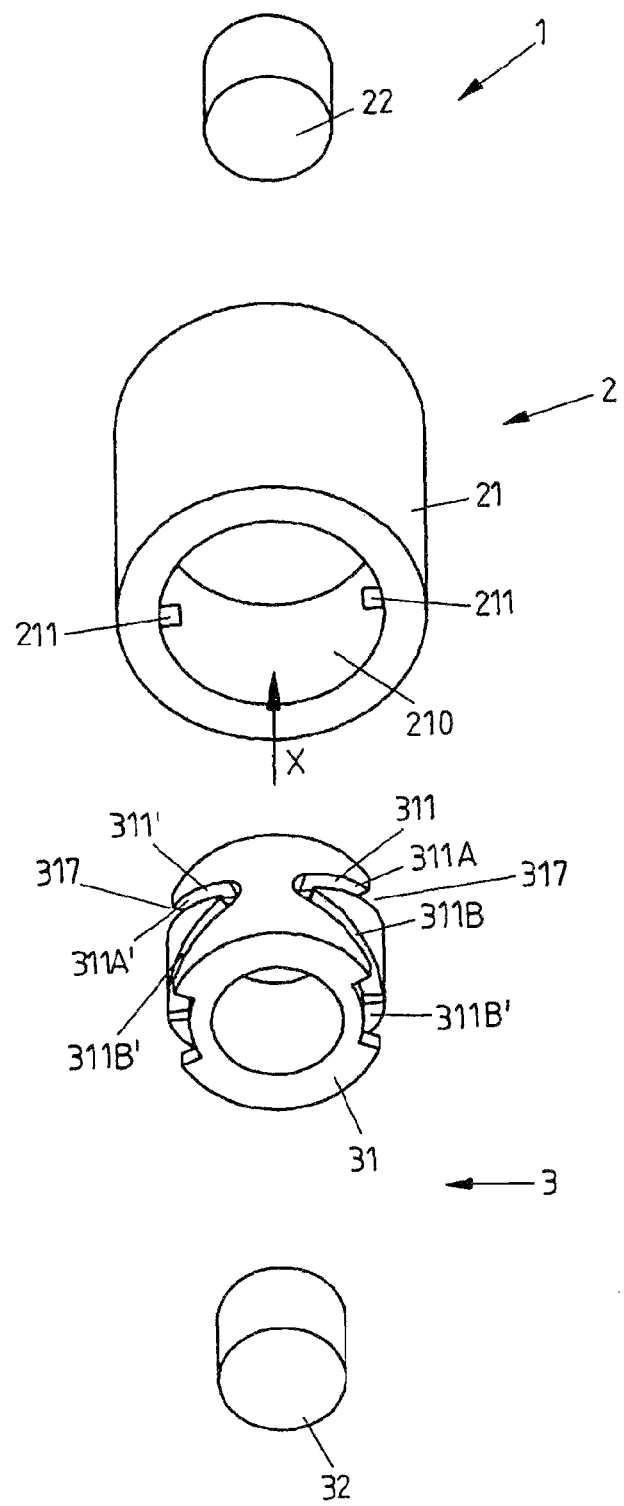

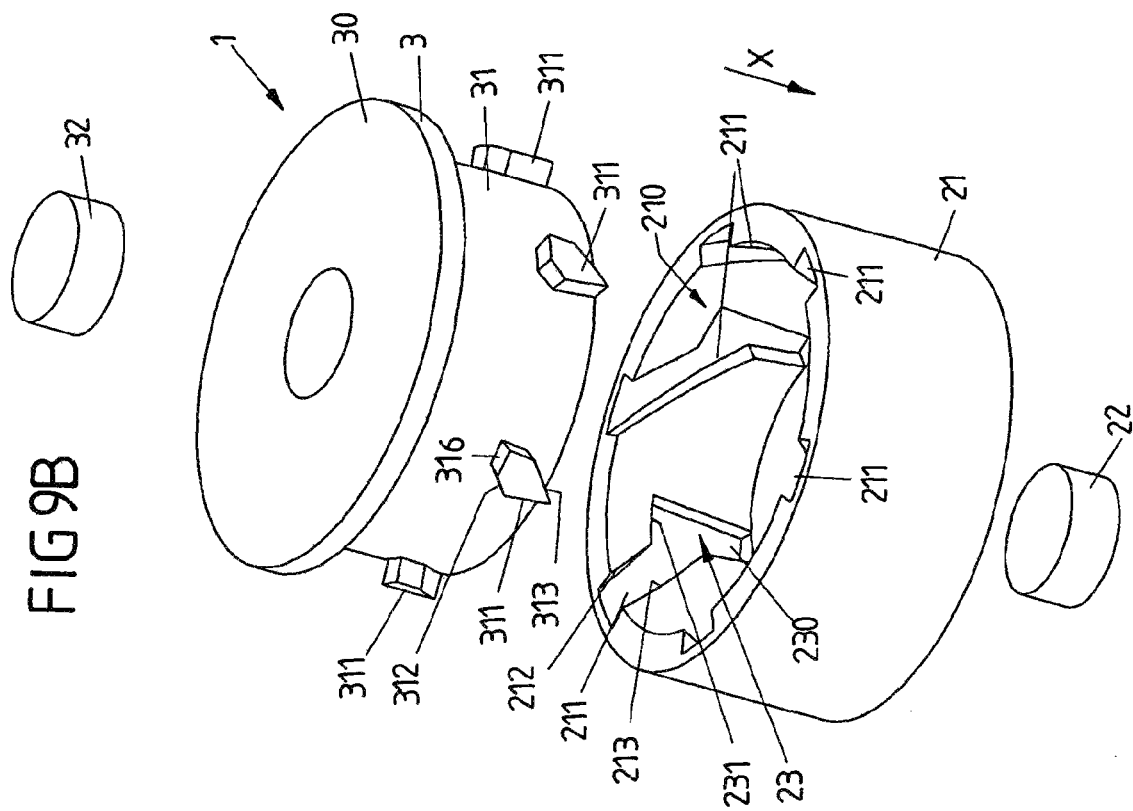
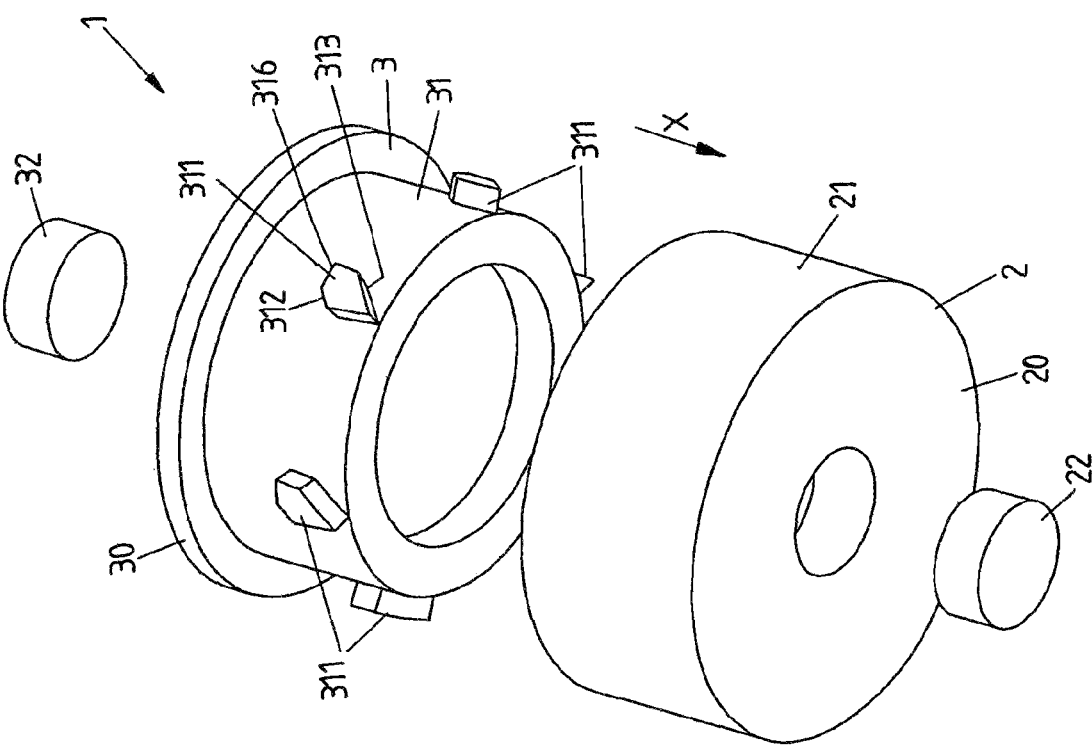

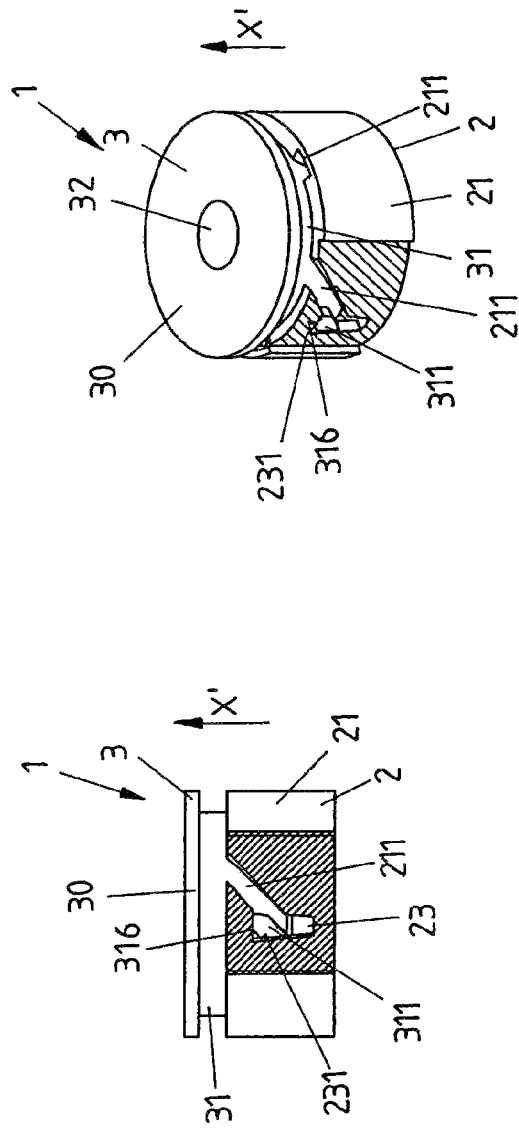

CLOSURE DEVICE FOR SECURING AN ELECTRONIC DEVICE ON A HOLDING DEVICE

CROSS-REFERENCE TO RELATED APPLICATIONS

This application is the United States national phase of International Application No. PCT/EP2015/002344 filed Nov. 23, 2015, and claims priority to German Patent Application No. 10 2014 223 844.7 filed Nov. 21, 2014, the disclosures of which are hereby incorporated in their entirety by reference.

BACKGROUND OF THE INVENTION

Field of the Invention

The invention relates to a closure device.

Description of Related Art

Such a closure device serves in particular for the fastening of an electronic device to a holding device.

For example, with the aid of such a closure device, a mobile telephone, especially a smartphone, or some other communication device, such as a navigational device or the like, can be secured to a holding device, such as a dashboard of a vehicle or the like.

Such a closure device comprises a first closure part having a first attaching part, and a second closure part having a second attaching part. The second closure part can be attached to the first closure part in a closing direction. At least one thread is arranged on one of the attaching parts and at least one engaging element is arranged on the other of the attaching parts for running onto the at least one thread when attaching the closure parts to one another.

From WO 92/180 28 A1 there is known a closure device in which in each case a thread is arranged on closure parts. Each closure part has a magnet, which assists in an attaching of the closure parts magnetically to each other. After attaching the closure parts to one another, the closure parts need to be manually screwed together in order to complete the closure.

SUMMARY OF THE INVENTION

A problem which the present invention proposes to solve is to provide a closure device which enables a supporting of an electronic device on an associated holding device, such as a dashboard of a vehicle, in a simple, convenient and mechanically stable manner.

Accordingly, a magnetic device is additionally provided in the closure device, which acts in a magnetically attracting manner between the first closure part and the second closure part during the attaching process. The at least one thread has a pitch such that, when attaching the closure parts to one another, as a result of the magnetically attractive effect of the magnetic device, the at least one thread and the at least one engaging element run onto one another, and thereby the closure parts are automatically twisted in relation to one another in a rotational direction about the closing direction.

By the pitch is meant here, in keeping with the usual understanding, a measure of the steepness of the thread. The pitch corresponds to the distance traveled in the closing direction between the closure parts per twisting distance when twisting the closure parts relative to one another.

The engaging of the thread on the attaching part of the one closure part and the engaging element on the other closure part is thus not self-locking. By attaching the closure parts to each other in the closing direction, the thread of the one attaching part spontaneously engages with the engaging element of the other attaching part, so that the attaching parts and through them the closure parts are spontaneously screwed together, effected by the magnetic attraction force between the closure parts.

The result is a very simple attachment process, only requiring that a user set (approximately) the closure parts onto one another. The mechanical interlocking by screwing the closure parts together takes place under the action of the magnetic attraction force of the magnetic device, the magnetic device being appropriately dimensioned for this.

For example, each closure part has a magnetic element in the form of a permanent magnet, which when the closure parts are set one onto the other point toward each other with unlike poles, so that a magnetic attraction force exists between the magnetic elements.

In one embodiment, one or more threads can be arranged on each attaching part. Thus, in each case one or more threads are arranged on the first attaching part of the first closure part and the second attaching part of the second closure part, which threads run onto each other when the closure parts are set on each other and thereby bring the closure parts into screwing engagement with each other.

In a connected state in which the closure parts are set on each other, the at least one thread of the one attaching part and the at least one engaging element of the other attaching part, for example likewise in the form of a thread, engage each other in a screwed manner. The closure parts are held in position relative to each other by the magnetic device, and the magnetic device resists an untwisting of the closure parts relative to each other to loosen the thread engagement.

In addition, a mechanical interlocking can also be provided, which holds the closure parts in position against each other when the closure parts have been set one on the other and are in their connected state. Such a mechanical interlocking resists an untwisting of the closure parts relative to each other against the rotational direction and thus secures the closure device against an (unintentional) opening.

Such a mechanical interlocking can be produced by a protruding element on one of the closure parts, which in the connected state bears against a bearing surface of the other closure part and thereby prevents an untwisting of the closure parts from the connected state.

The protruding element can be formed for example on a locking lever which is elastically joined to a housing part of the associated closure part. Thus, if the closure parts are mechanically interlocked in the connected state, the locking lever can be activated in order to bring the protruding element out from bearing against the bearing surface of the other closure part and thus loosen the mechanical interlocking. Once the mechanical interlocking is loosened, the closure parts can be twisted out from their connected position in order to open the closure device in this way.

The first attaching part and/or the second attaching part in one advantageous embodiment are formed conical to the closing direction, at least for a portion. Thus, the first attaching part and the second attaching part are not formed cylindrical to the closing direction, but at least for a portion conical, which can make it easier to set the attaching parts on each other.

By a conical configuration is meant here that the first attaching part and/or the second attaching part have an enveloping geometrical body which is conical in its base form, i.e., it has the base form of a truncated cone, for example. It is not necessary for the first attaching part and/or the second attaching part to have a conical form overall, but rather it is enough for segments of the first attaching part and/or the second attaching part to be determined by the conical base form of the enveloping body.

The attaching parts can be conically shaped at their threads or also at other surface sections which come to bear against each other when the attaching parts are set on one another.

In particular, threads of one or both attaching parts on a side facing the other attaching part of the other closure part can be inclined at an angle to the closing direction and thus be conically formed.

The setting of the attaching parts on one another can be further improved in that the threads—viewed along the closing direction—have a variable height. In particular, one thread at a front end can have a smaller height than at another rear end.

By the height is meant here the distance measured along the closing direction between a front guide surface of the thread in the closing direction and a rear guide surface of the thread in the closing direction. This distance, viewed along the thread, can be variable and thus take on different values at different locations. For example, the height can change continuously and become continuously larger, for example, viewed in the rotational direction.

The at least one thread can, in one embodiment, be designed straight and thus extend in linear manner about the attaching part, which is cylindrical in its base form, wherein threads on the one attaching part extend for example along an outer envelope surface, while associated threads on the other attaching part extend along an inner envelope surface in an opening of the attaching part.

However, it is also conceivable and possible for the threads to not run in a straight line, but instead to change their direction and have different pitches. Thus, a thread may have a first segment and a second segment, having different pitches from each other. Thus, for example, a first segment may be inclined toward the closing direction, while a second one can run along the closing direction. In particular, this results in a combined twisting and pulling movement for the opening of the closure device, which is designed to prevent an unintentional opening.

The segments can also be directed such that they point in different directions and produce a twisting of the closure parts relative to each other when attached in different rotational directions. Thus, a twisting of the closure parts relative to each other in a first rotational direction can be produced upon engaging of the at least one engaging element in the first segment of the at least one thread when the closure parts are set on one another, while a twisting of the closure parts relative to each other in the reverse rotational direction, namely, a second rotational direction, opposite the first rotational direction occurs upon engaging of the at least one engaging element in the second segment of the at least one thread. The segments adjoin each other, so that after moving through the first segment of the thread the engaging element runs into the second segment and thus the twisting direction of the closure parts relative to each other is reversed. Additional segments may also adjoin the second segment, so that the thread can extend in meandering form along the associated attaching part.

In another embodiment, each thread on an attaching part can also be assigned a complementary, mirror-symmetrical thread. Upon engagement of an engaging element in the thread, the closure parts move in predetermined manner relative to each other. On the other hand, if the engaging element engages with the complementary thread, the closure parts move in the reverse, mirror-symmetrical manner relative to each other. Thus, the movement of the closure parts relative to each other when set on one another is fundamentally the same, but the reverse of each other. Such a complementary thread makes it possible to screw together the closure parts in different directions.

In one embodiment, the at least one thread, viewed in the rotational direction, is adjoined by a guide segment, in which the engaging element is introduced after passing through the thread in the closing direction. This guide segment for example extends along the closing direction and constitutes a catch for the engaging element. After passing through the thread, the engaging element ends up in the area of the guide segment and is moved in the closing direction in the guide segment. In a closed position, in which the closure parts are set on each other, the engaging element thus lies in the guide segment, whereby a twisting of the closure parts relative to each other opposite the rotational direction is blocked.

In another embodiment, the guide segment can have a bearing surface extending transversely to the closing direction, which bounds off the guide segment against the closing direction. If the closure parts are moved away from each other in order to open the closure device and for this the closure parts are moved away from each other against the closing direction, the engaging element is moved within the guide segment against the closing direction and comes to bear against the bearing surface bounding off the guide segment against the closing direction. A further moving of the closure parts away from each other against the closing direction is thus blocked, so that an opening of the closure simply by pulling on the closure parts against the closing direction is not easily possible and in particular an unwanted opening of the closure device in this way is prevented.

Only if the closure parts are twisted relative to each other against the rotational direction and thus the engaging element is moved out from the area of the bearing surface of the guide segment can the closure parts be separated from each other by sliding the engaging element against the rotational direction along the thread and thus loosening the connection between the closure parts.

The opening of the closure is thus not possible by a simple pulling on the closure parts against the closing direction. Instead, it is necessary to move the engaging element at first against the closing direction within the guide segment and then twist the closure parts relative to each other against the rotational direction in order to open the closure. This is only possible with a deliberate maneuver, so that an unintentional opening of the closure is prevented.

The electronic device can be designed as a mobile telephone, for example, especially a smartphone. But the electronic device can also be a navigation device or some other communication device. The holding device may be, for example, a dashboard on which the electronic device is meant to be secured.

BRIEF DESCRIPTION OF THE DRAWINGS

The fundamental notion of the invention shall be explained more closely below with the aid of the exemplary embodiments represented in the figures. There are shown:

FIG. 1A, 1B, perspective views of a closure device with two closure parts, which can be brought into screw engagement with each other;

FIG. 1C, a schematic view showing the pitch of a thread;

FIG. 1D, the varying height of a thread in a schematic view;

FIG. 2A, a top view of a closure device;

FIG. 2B, a cross sectional view along line B-B of FIG. 2A;

FIG. 4, a perspective view of the closure device of FIG. 3, in a connected state of closure parts of the closure device;

FIG. 5, a top view of the closure device of FIGS. 3 and 4;

FIG. 6A, a top view of the closure device;

FIG. 6B, a cross sectional view along line A-A of FIG. 6A;

FIG. 8A, 8B, perspective views again of another exemplary embodiment of a closure device;

FIG. 9A, 9B, perspective exploded views of another exemplary embodiment of a closure device;

FIG. 15A, a perspective view of the closure device upon opening;

FIG. 15B, a partly cut-open side view of the closure device upon opening;

DETAILED DESCRIPTION OF THE INVENTION

Figure 3:
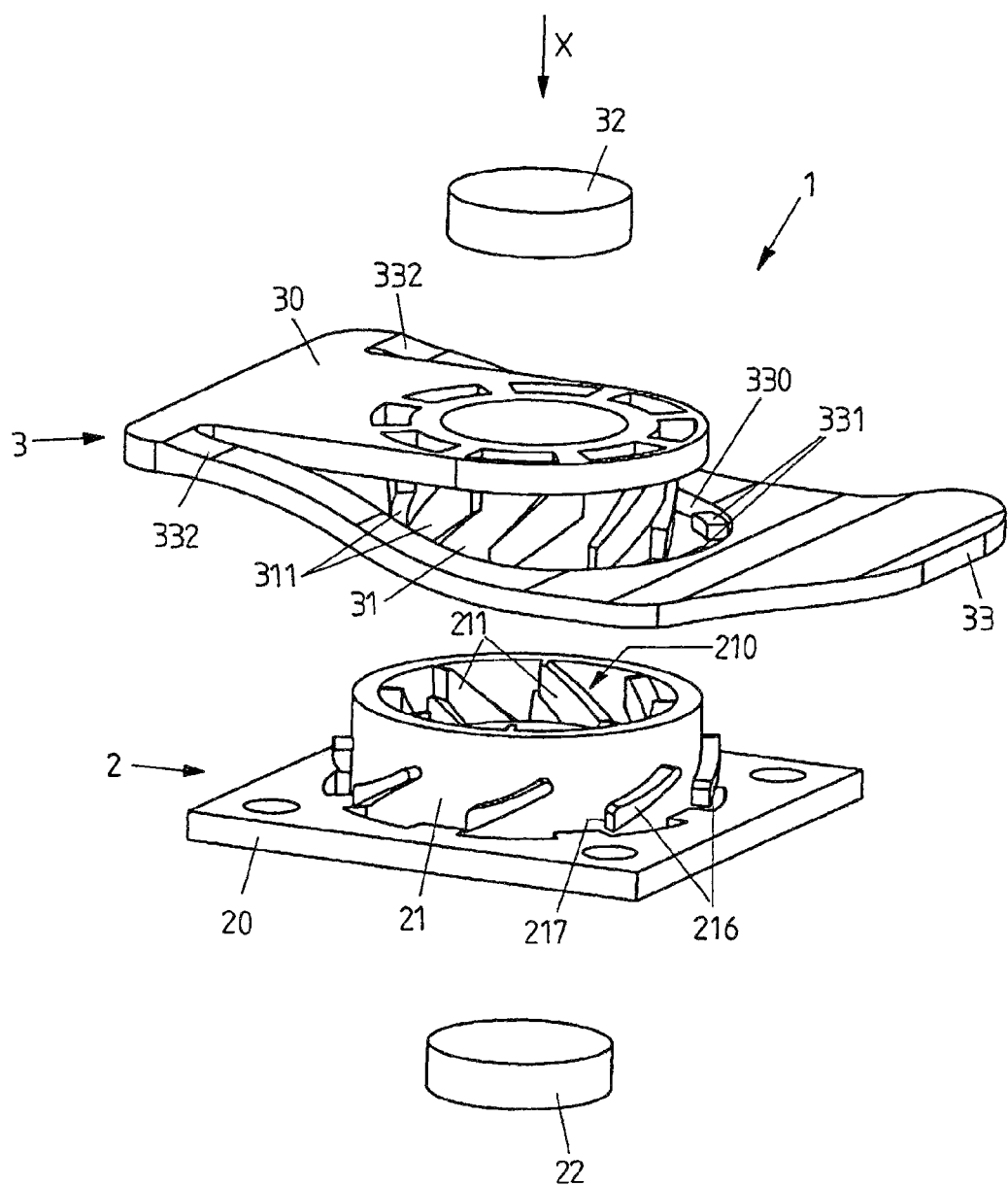
FIG. 3, a perspective view of another exemplary embodiment of a closure device.

FIG. 1A, 1B show a exemplary embodiment of a closure device 1, having a first closure part 2 in the form of a female part and a second closure part 3 in the form of a male part. Each closure part 2, 3 has an attaching part 21, 31, which can be set against each other in a closing direction X.

While the one closure part 2 has an attaching part 21 with an inner opening 210, the attaching part 31 of the other closure part 3 is formed in the nature of a peg, which can be inserted into the attaching part 21 of the first closure part 2 in the closing direction X.

Threads 211 are formed on an inner envelope surface of the opening 210, which can be brought into thread engagement with threads 311 on an outer envelope surface 310 of the attaching part 31 of the second closure part 3 when the closure parts 2, 3 are placed one on the other.

When the closure parts 2, 3 are placed one on the other, the threads with straight guide surfaces 212, 312 run onto each other, the guide surfaces 212, 312 having a pitch a which is large enough so that the thread engagement of the threads with each other is not self-locking.

A magnetic element 22, 32 in the form of a permanent magnet is formed on each closure part 2, 3. The magnetic elements 22, 32 are magnetically attractive to each other and assist the setting of the closure parts 2, 3 one on the other such that during setting the threads 211, 311 run onto each other and the closure parts 2, 3 are spontaneously twisted toward each other in a rotational direction D with the threads 211, 311 bearing against each other.

The threads 211, 311 make contact with each other at rear guide surfaces 213, 313 when the closure parts 2, are twisted back for the opening of the closure device 1. These guide surfaces are also straight in configuration, but as shown schematically in FIG. 1C they have a different pitch 8 than the pitch a of the guide surfaces 212, 312.

As shown schematically in FIG. 1D, the height H1, H2 of the threads 211, 311 varies such that the threads 211, 311 at a first end 214, 314 have a smaller height H1 than at a second end 215, 315.

In the exemplary embodiment of FIG. 2A, 2B, the attaching parts are conically formed for at least a portion, especially at their threads 211, 311, so that an angle γ is made with the closing direction X.

In the exemplary embodiment of FIGS. 3 to 6A, 6B, the closure parts 2, 3 are mechanically interlocked in a connected state, in that protruding elements 331 at an opening 330 of a locking lever 33 of the second closure part 3 come to bear against bearing surfaces 217 on outer threads 216 on the outside of the first attaching part 21 in the connected state of the closure parts 2, 3, as shown in FIGS. 4 and 5. The locking lever 33 is elastically adjustable with respect to a housing segment 30 of the second closure part 3, so that by activating the locking lever 33 the interlocking can be released for opening of the closure device 1.

In the exemplary embodiment of FIGS. 3 to 6A, 6B, for the closing of the closure device 1 the second (male) closure part 3 is set on the first (female) closure part 2 in the closing direction X. The engaging elements 311 of the second closure part 3, formed by threads, run onto associated threads 211 on the cylindrical inner envelope surface inside the opening 210 of the attaching part 21 of the first closure part 2, while the closure parts 2, 3 by virtue of the magnetic forces produced by the magnetic elements 22, are spontaneously twisted toward each other and thereby brought into engagement with each other.

When the closure parts 2, 3 are twisted toward each other for the closing of the closure device 1, in addition to the running of the inner threads 211, 311 onto each other, the protruding elements 331 at the inner periphery of the opening 330 of the locking lever 33 run onto the outer threads 216 on the cylindrical outer envelope surface of the attaching part 21. This has the effect that the locking lever 33, being elastic to the housing segment 30, is (slightly) deflected against the closing direction X and the protruding elements 331, after having passed the outer threads 216, snap behind the bearing surfaces 217 and thus come to lie in the area of the bearing surfaces 217, as represented in FIGS. 4 and 5.

Owing to the interaction between the protruding elements 331 and the bearing surfaces 217 of the threads 216, a rotary movement of the closure parts 2, 3 against the rotational direction D is thus not easily possible. Instead, for the opening of the closure device 1, the locking lever 33 must first be lifted relative to the threads 216 until the protruding elements 331 are free from the area of the bearing surfaces 217. Only then can the closure parts 2, 3 be twisted relative to each other against the rotational direction D in order to open the closure device 1.

Figure 7A:
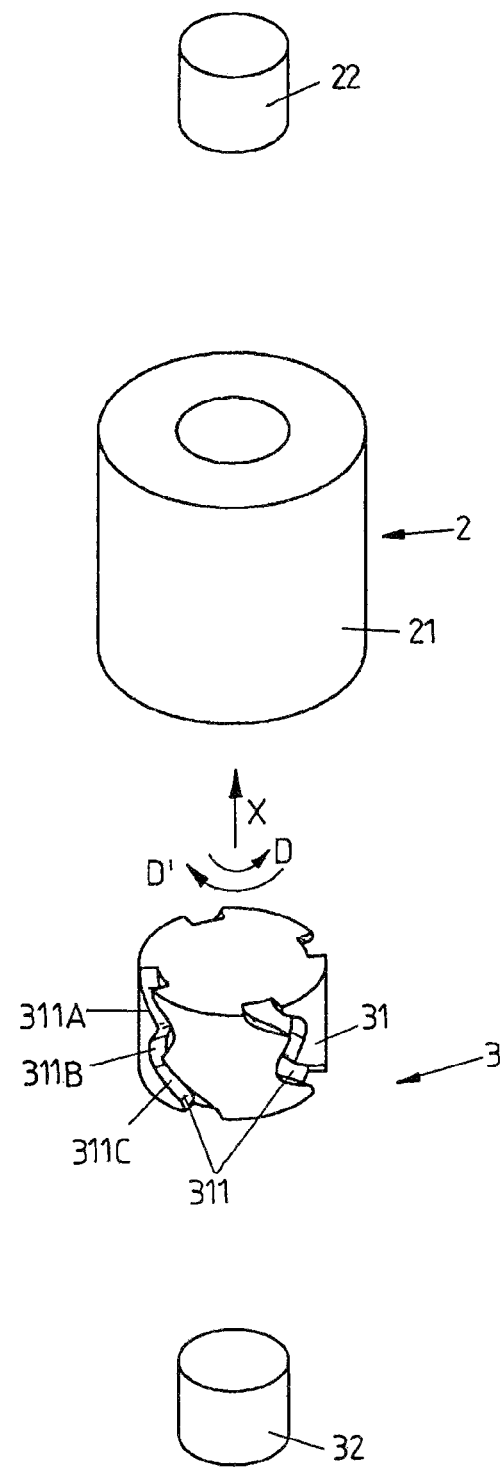
FIG. 7A, 7B, perspective exploded views of another exemplary embodiment of a closure device.
Figure 7B:
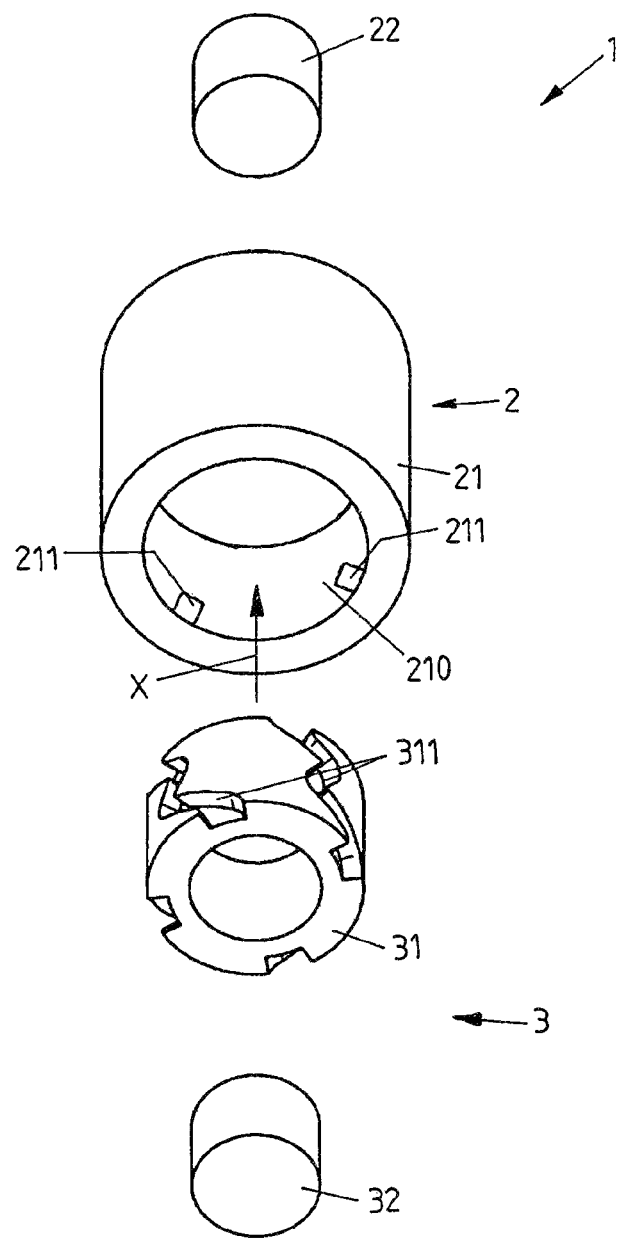

In the exemplary embodiment of FIG. 7A, 7B, the attaching part 31 of the second closure part 3 has threads having different segments 311A, 311B, 311C, with different directions. In the opening 210 of the attaching part 21 of the first closure part 2 there are formed peglike engaging elements 211, which when the closure parts 2, 3 are placed on one another come into engagement with the threads 311. Thanks to the different segments of the threads, the closure parts 2, 3 are twisted relative to each other in different rotational directions D, D'.

Thanks to the threads 311 having steps, an unintentional opening of the closure device 1 from its connected state is prevented in particular.

The pitch of the threads 311 in the different segments 311A, 311B, 311C is such that the closure parts 2, 3 when placed on one another are drawn spontaneously into engagement with each other in the closing direction X, due to the magnetically attractive interaction between the magnetic elements 22, 32 on the part of the first closure part 2 on the one hand and the second closure part 3 on the other hand.

Figure 8A:
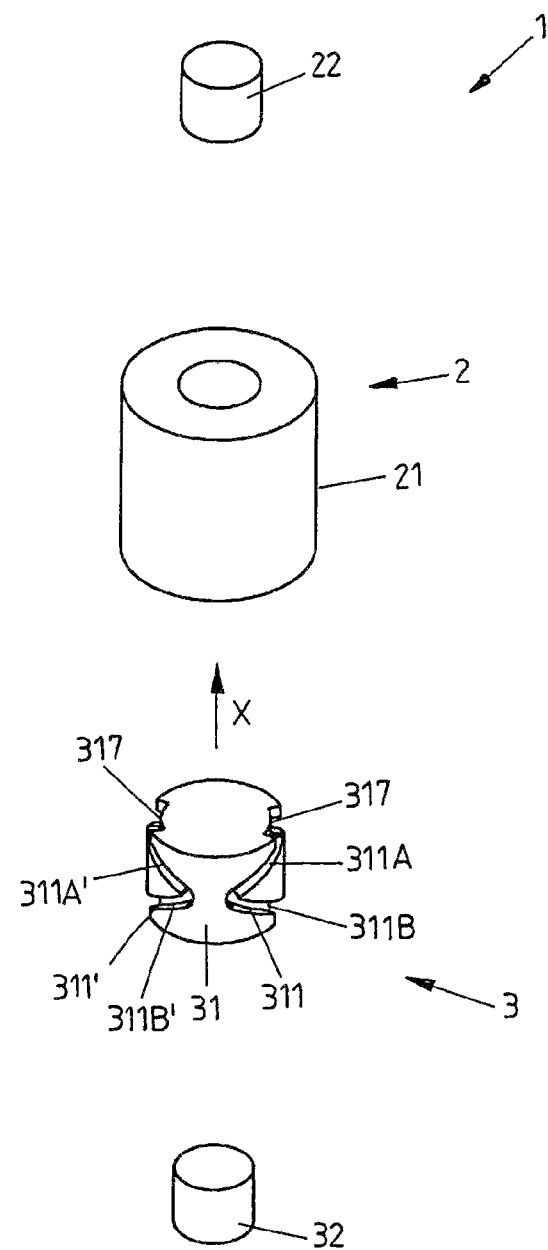
Figure 10A:
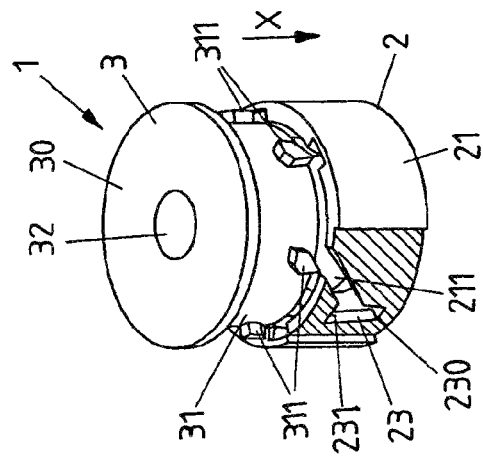
FIG. 10A, a perspective representation of the closure device in an open position.
Figure 10B:
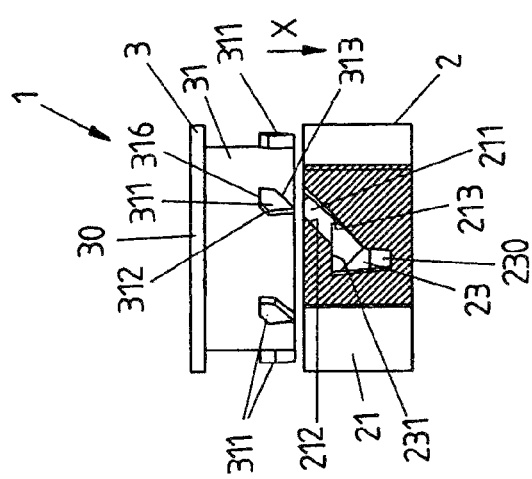
FIG. 10B, a partly cut-open side view of the closure device in the open position.
Figure 11A:
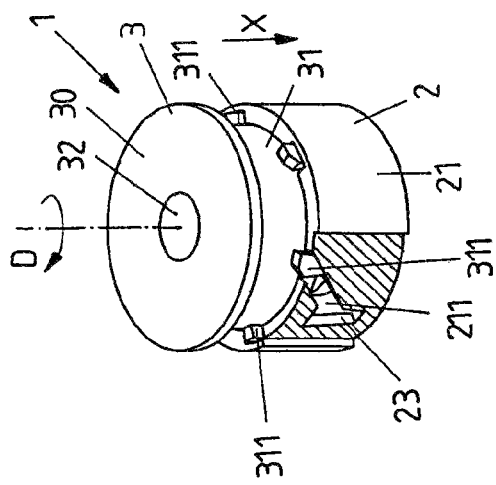
FIG. 11A, a perspective view of the closure device upon closing.
Figure 11B:
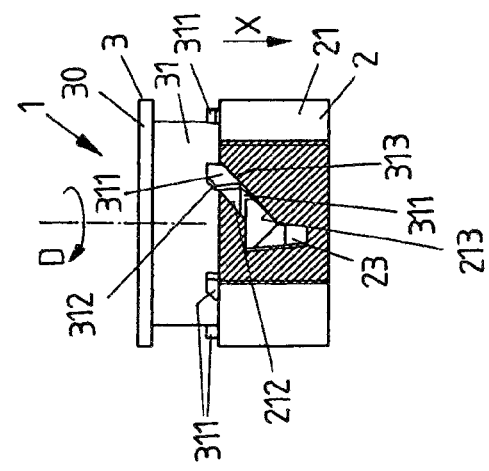
FIG. 11B, a partly cut-open side view of the closure device upon closing.
Figure 12A:
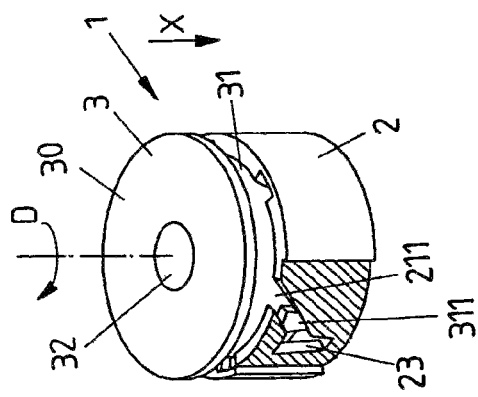
FIG. 12A, a perspective view of the closure device upon further closing.
Figure 12B:
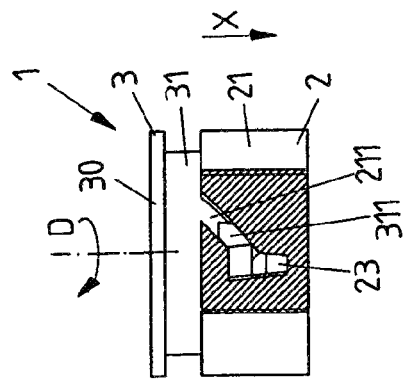
FIG. 12B, a partly cut-open side view of the closure device upon further closing.
Figure 13A:
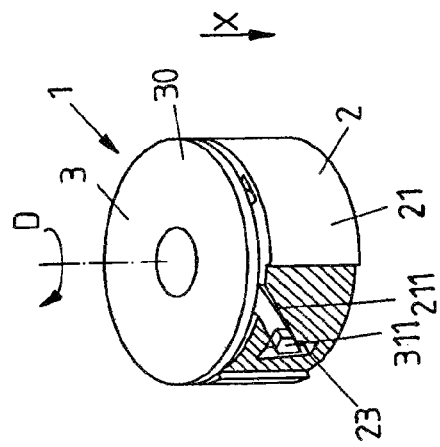
FIG. 13A, a perspective view of the closure device upon inserting of an engaging element of the one closure part into a guide segment of the other closure part.
Figure 13B:
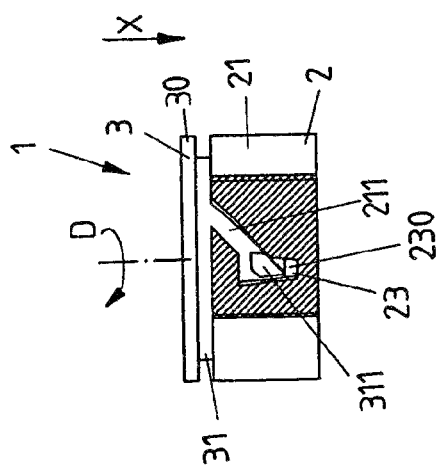
FIG. 13B, a partly cut-open side view of the arrangement of FIG. 13A.

In the exemplary embodiment of FIG. 8A, 8B, each thread 311 has a complementary thread 311', which has a mirror symmetry shape, so that the closure parts 2, 3 can be placed on one another with clockwise or counterclockwise rotation. Each thread 311 and each complementary thread 311' has two different segments 311A, 311B, 311A', 311B' of different direction.

When the first closure part 3 is set onto the second closure parts 2 in the closing direction X, engaging elements 211 within the opening 210 of the first closure part 2 are each inserted into an entrance site 317 which is common to the threads 311, 311'. The engaging elements 211 can now be introduced either clockwise into the segment 311A of the one thread 311 or counterclockwise into the segment 311A' of the other, complementary thread 311'. After running through this first segment 311A, 311A', the engaging elements 211 then run through the adjoining, oppositely directed segment 311B, 311B', assisted by the magnetic attraction force of the magnetic elements 22, 32, so that the closure parts 2, 3 after passing the threads 311, 311' end up in a closed position.

The opening of the closure device 1 is possible once again in different rotational directions. Thus, for the opening of the closure device 1, the first closure part 2 can be twisted relative to the second closure part 3 so that the engaging elements 211—moving clockwise—at first run into the segments 311B of the one thread 311 or—moving counterclockwise—into the segments 311B' of the other, complementary thread 311'. After running through the respective segment 311B, 311B', the engaging elements 211 then arrive once more in the oppositely directed, adjoining segment 311A, 311A', after passing which the engaging elements 211 emerge at the entrance sites 317 from the respective threads 311, 311' and thus the closure parts 2, 3 can be separated from each other.

Owing to the provision of the threads 311 and the complementary threads 311' assigned to them, a closing of the closure device 1 by setting of the closure parts 2, 3 on each other and by twisting the closure parts 2, 3 in different initial rotational directions to each other, i.e., initially counterclockwise or initially clockwise, is possible. After running through a first segment 311A, 311A' (when closing) or 311B, 311B' (when opening), the rotational direction then reverses, due to the opposite orientation of the segments 311A, 311B, 311A', 311B' of each one of the threads 311, 311' relative to the other.

FIG. 9A, 9B to 16A, 16B show a further exemplary embodiment of a closure device 1 having two closure parts 2, 3, which can be set one on the other for the closing of the closure device 1 in a closing direction X. A first closure part 3 here is a female part, having an opening 210 on an attaching part 21, into which a second closure part 3 in the form of a male part with a peglike attaching part 31 can be inserted.

In this exemplary embodiment, engaging elements 311 in the form of protrusions are formed on the attaching part 31 of the second closure part 3, which come into engagement with threads 211 on the inner envelope surface of the opening 210 of the attaching part 21 of the first closure part 2 and thus run into the threads 311 when the closure parts 2, 3 are set on one another.

The engaging elements 311 each have two parallel oriented, slanting guide surfaces 312, 313, which upon running into the threads 211 come into contact with guide surfaces 212, 213 bounding the threads 211. The pitch of the threads 211 here is such that, when the closure parts 2, 3 are set on each other, the engaging elements 311 slide spontaneously along the threads 211 due to the magnetic attraction force of magnetic elements 22, 32 of the closure parts 2, 3 and thus automatically produce the connection between the closure parts 2, 3.

The threads 211 into which the engaging elements 311 run when the closure parts 2, 3 are set one on the other are each adjoined by a guide segment 23, which extends vertically along the closing direction X and constitutes a catch for the respective associated engaging element 311. After passing the associated thread 211, the engaging element 311 runs into the guide segment 23 adjoining the thread 211 and is pulled in thanks to the magnetic attraction force between the magnetic elements 22, 32 into a receiving segment 230 of the guide segment 23, so that the engaging element 311 in the closed position of the closure device 1 lies in the receiving segment 130 of the guide segment 23.

Figure 14A:
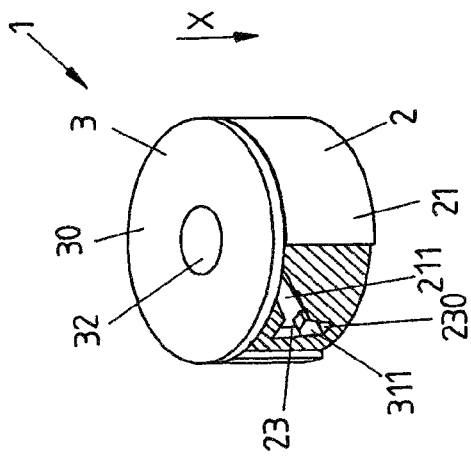
FIG. 14A, a perspective view of the closure device in a closed position.
Figure 14B:
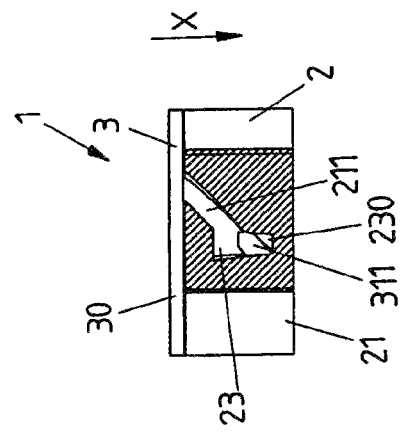
FIG. 14B, a partly cut-open side view of the closure device in the closed position.

The closure device 1 when closing is shown in different views in FIG. 10A, 10B to 13A, 13B. FIG. 14A, 14B show the closure device 1 in its closed position. FIGS. 15A, 15B and 16A, 16B show the closing device 1 when opening.

The views of FIG. 10A, 10B to 16A, 16B show on the one hand perspective views (FIG. 10A-16A) and on the other hand side views (FIG. 10B-16B). Each time, the first closure part 2 is partly cut open in the area of a thread 211, so that one can see how an associated engaging element 311 of the second closure part 3 moves inside the thread 211 when the closure device 1 is closed or opened.

Because each engaging element 311 in the closed position (FIG. 14A, 14B) lies in the receiving segment 230 of the guide segment 23 adjoining the associated thread 211, a twisting of the closure parts 2, 3 relative to each other is blocked in the closed position. In particular, the second closure part 3 cannot be twisted against the rotational direction D relative to the first closure part 2, so that an (unintentional) opening of the closure device 1 is prevented.

In order to open the closure device 1, it is necessary to first move the second closure part 3 against the closing direction X, i.e., in the opposite direction X', relative to the first closure part 2, in order to thereby lift each engaging element 311 in the associated guide segment 23 in the direction X', as is shown in FIG. 15A, 15B. The guide segment 23 is bounded off by a bearing surface 231 against the closing direction X, i.e., in the direction X', so that upon opening the closure device 1 the associated engaging element 311 comes to bear by a bearing surface 316 against this bearing surface 231 when the second closure part 3 is moved in the direction X' toward the first closure part 2. A further movement of the second closure part 3 in the direction X' is prevented in this way, and thus in particular the closure device 1 cannot be opened simply by pulling on the closure parts 2, 3.

Figure 16A:
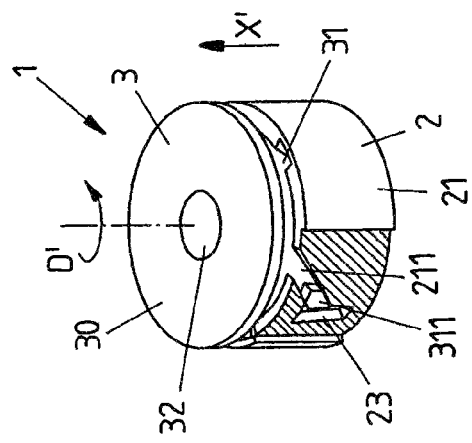
FIG. 16A, a perspective view of the closure device upon further opening.
Figure 16B:
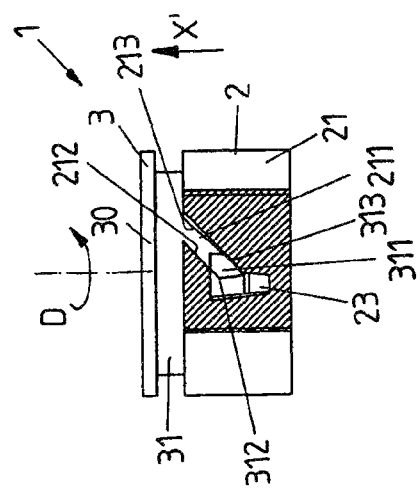
FIG. 16B, a partly cut-open side view of the closure device upon further opening.

Instead, it is necessary, after lifting the engaging elements 311 in the guide segment 23, to twist the closure parts 2, 3 relative to each other in the rotational direction D' opposite the rotational direction D, so that the engaging elements 311 slide along the threads 211 and the closure parts 2, 3 are thus separated from each other, as shown in FIG. 16A, 16B.

Once the engaging elements 311 have been rotated out from the area of the threads 211, the closure parts 2, 3 can be removed from each other.

In the closed position per FIG. 14A, 14B, the closure parts 2, 3 are held against each other on account of the magnetic attraction forces, so that the engaging elements 311 are magnetically held in the receiving segments 230 of the guide segments 23. An unwanted, inadvertent opening of the closure device 1 is thus at least made difficult. For the opening, a user must move the closure parts 2, 3 away from each other against the acting magnetic attraction force of the magnetic elements 22, 32, so that the engaging elements 311 slide in the direction X' inside the guide segments 23, and then the closure parts 2, 3 need to be twisted relative to each other in the rotational direction D' in order to open the closure device 1.

The magnetic elements 22, 32 can be designed as a permanent magnet, the magnetic elements 22, 32 being directed toward each other by unlike poles, thus magnetically assisting the setting of the closure parts 2, 3 on each other.

It is likewise conceivable and possible for one of the magnetic elements 22, 32 to be configured as a permanent magnet and the other of the magnetic elements 22, 32 as a magnetic armature of ferromagnetic material, yet without its own permanent magnet effect.

Furthermore, it is conceivable and possible for the magnetic elements 22, 32 to have several mutually offset poles in a plane transverse to the closing direction X. In this way, the magnetic elements 22, 32 not only produce a magnetic attraction force in the closing direction X, but can also assist the twisting of the closure parts 2, 3. For example, each magnetic element 22, 32 can have two unlike magnetic poles in a plane transverse to the closing direction X, so that when the closure parts 2, 3 are set one on the other a magnetic torque is also produced to assist the closing movement.

The present invention is not confined to the exemplary embodiments shown, but can also be realized in entirely different fashion.

A closure device of the kind described here can be used not only for the connecting of an electronic device with a holding device, but also for entirely different purposes. In general, a closure device of the kind described here can be used for the connecting of two parts to each other.

LIST OF REFERENCE SYMBOLS 1 closure device
2 closure part (female part)
20 housing part
21 attaching part
210 opening
211 threads
212, 213 guide surfaces
214, 215 end
216 locking elements
217 bearing surface
218 side
22 magnetic element
23 guide segment
230 receiving segment
231 bearing surface
3 closure part (male part)
30 housing part
31 attaching part
310 opening
311 threads
311A-C segment
312, 313 guide surface
314, 315 end
316 bearing surface
317 entrance site
318 outside
32 magnetic element
33 locking lever
330 opening
331 protruding elements
332 connecting arms
α, β pitch angle
D, D' rotational direction
H1, H2 height
X closing direction

The invention claimed is:

1. A closure device for securing an electronic device on a holding device, comprising:
a first closure part having a first attaching part,
a second closure part having a second attaching part and which can be attached to the first closure part in a closing direction, wherein at least one thread is arranged on one of the attaching parts and at least one engaging element is arranged on the other of the attaching parts for running onto the at least one thread when attaching the closure parts to one another, and
a magnetic device that acts in a magnetically attracting manner between the first closure part and the second closure part during the attaching process, wherein the at least one thread has a pitch such that, when attaching the closure parts to one another, as a result of the magnetically attractive effect of the magnetic device, the at least one thread and the at least one engaging element run onto one another, and the closure parts are thereby automatically twisted in relation to one another in a rotational direction about the closing direction,
wherein, in a connected state in which the closure parts are set on each other, the closure parts are mechanically interlocked to resist a twisting against the rotational direction.

2. The closure device as claimed in claim 1, wherein in each case at least one thread is arranged on the first attaching part and the second attaching part, which threads run onto each other when the closure parts are set on each other.

3. The closure device as claimed in claim 1, wherein the magnetic device in a connected state in which the closure parts are set on each other resists a twisting of the closure parts relative to each other against the rotational direction.

4. The closure device as claimed in claim 1, wherein in the connected state a protruding element of one of the closure parts bears against a bearing surface of the other of the closure parts against the rotational direction.

5. The closure device as claimed in claim 4, wherein the protruding element is formed on a locking lever which is elastically joined to a housing part of the associated closure part so that the protruding element is movable to eliminate the contact with the bearing surface.

6. The closure device as claimed in claim 1, wherein the first attaching part and/or the second attaching part are formed conical to the closing direction, at least for a portion.

7. The closure device as claimed in claim 1, wherein the at least one thread on a side facing the attaching part of the other closure part is inclined at an angle to the closing direction.

8. The closure device as claimed in claim 1, wherein the at least one thread at a first end—measured along the closing direction—has a smaller height than at a second end.

9. The closure device as claimed in claim 1, wherein the at least one thread comprises a first segment and a second segment.

10. The closure device as claimed in claim 9, wherein the segments have different pitches and/or directions.

11. The closure device as claimed in claim 9, wherein when the closure parts are set on one another
a twisting of the closure parts relative to each other in a first rotational direction occurs upon engaging of the at least one engaging element in the first segment and
a twisting of the closure parts relative to each other in a second rotational direction, opposite the first rotational direction, occurs upon engaging of the at least one engaging element in the second segment.

12. The closure device as claimed in claim 1, wherein there is arranged on one of the attaching parts a thread which is complementary to the at least one thread, being formed in mirror symmetry to the at least one thread, so that the closure parts when set on one another can be twisted relative to each other in the rotational direction or also against the rotational direction.

13. The closure device as claimed in claim 1, wherein the at least one thread, viewed in the rotational direction, is adjoined by a guide segment, in which the engaging element is introducible after passing through the thread in the closing direction.

14. The closure device as claimed in claim 13, wherein in a closed position, in which the first closure part and the second closure part are set on each other, the engaging element lies in the guide segment and thereby a twisting of the closure parts relative to each other opposite the rotational direction is blocked.

15. The closure device as claimed in claim 13, wherein the guide segment has a bearing surface extending transversely to the closing direction, which bounds off the guide segment against the closing direction, wherein the engaging element upon moving within the guide segment against the closing direction comes to bear against the bearing surface.

\* \* \* \* \*